United States Patent Office 3,523,799
Patented Aug. 11, 1970

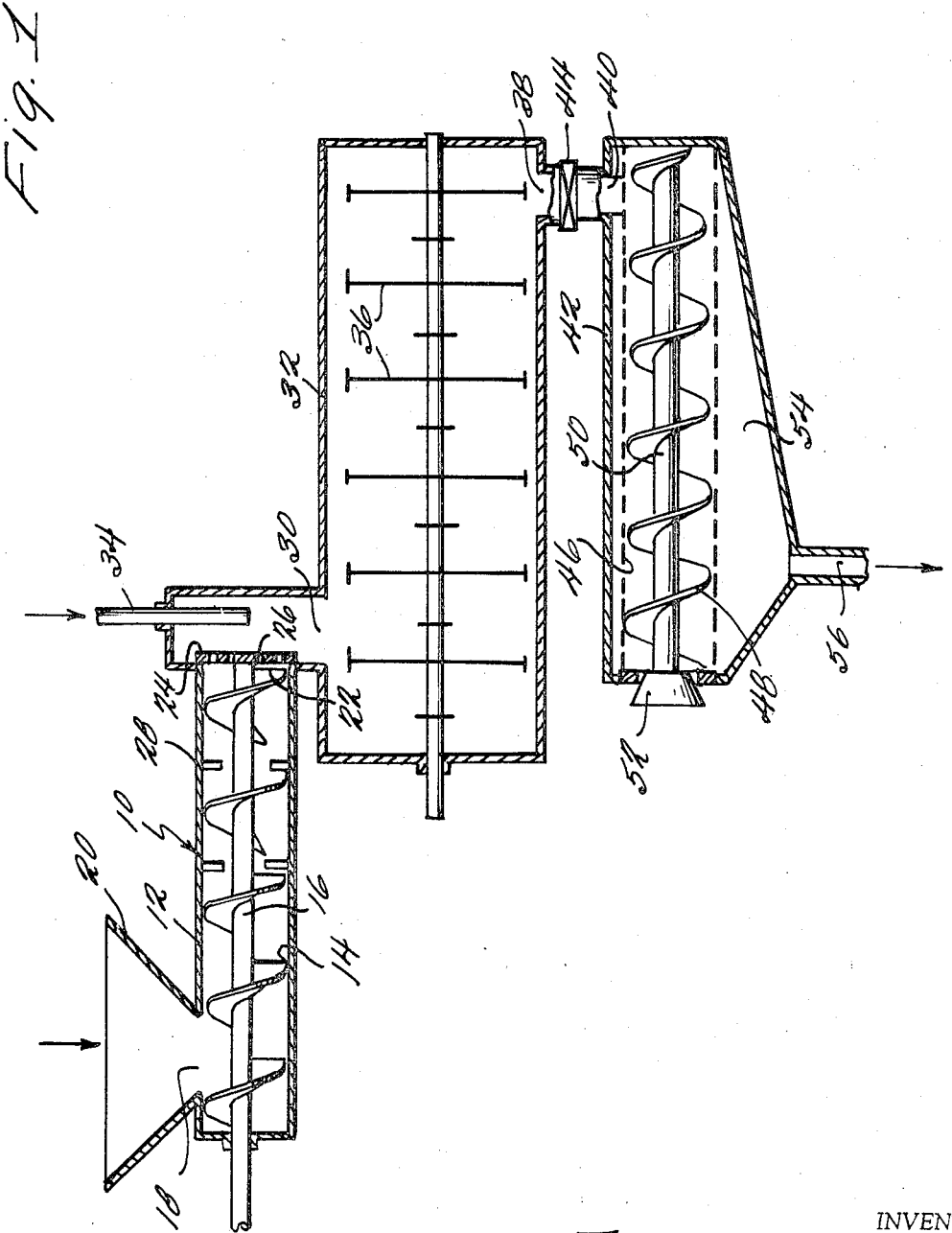

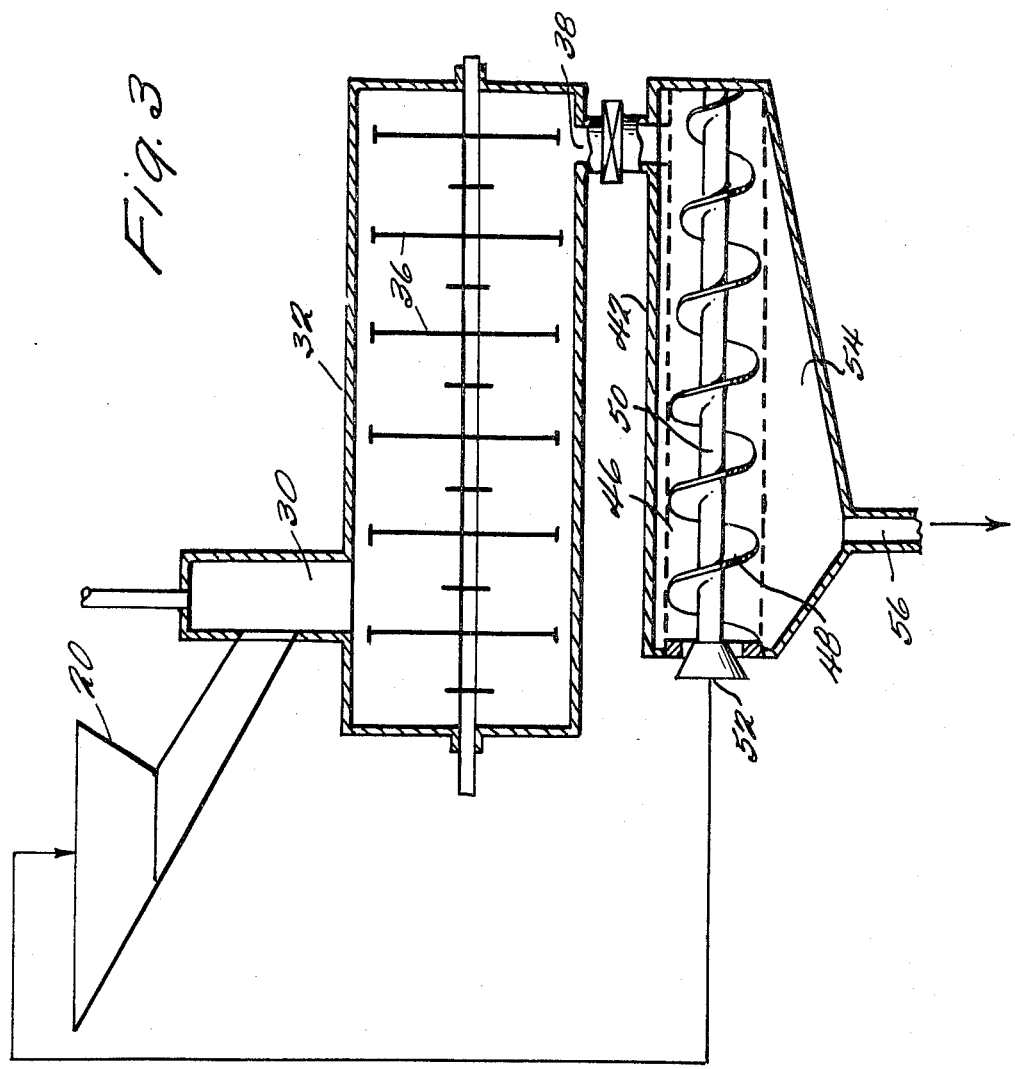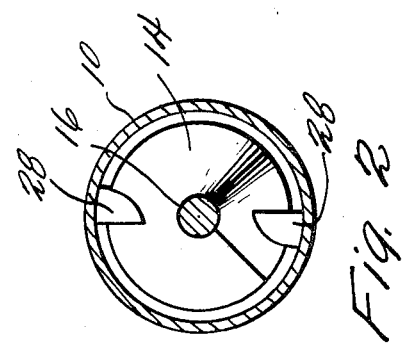

3,523,799
PROCESS AND APPARATUS FOR EXTRACTION OF HOPS WITH A SOLVENT
Francis L. Rigby, Toronto, Ontario, Canada, assignor to John I. Haas, Inc., Washington, D.C., a corporation of Delaware
Filed Nov. 25, 1966, Ser. No. 597,080
Int. Cl. C12c *9/02;* C12l *9/00*
U.S. Cl. 99—50.5                          7 Claims

ABSTRACT OF THE DISCLOSURE

Apparatus and process for extracting resins in the lupulin of hops with a solvent which includes extruding the hops under pressure whereby the lupulin is ruptured and the resins are released. The extruded hops are then suspended in a solvent for the released resins to provide a solvent-resin extract. The resulting suspension is then pressed to separate the solvent-resin extract from the remainder of the suspension.

---

This invention relates to a method and apparatus for producing hop extract. More particularly, the invention is concerned with a process and means for comminuting hops, extracting the comminuted hops with a solvent and subjecting the comminuted hops to pressure thereby expelling and recovering the solvent extract mixture from the hop residue.

Considerable efforts have been made in the past to find suitable methods and means for extracting hops with a solvent. Generally, these processes utilize percolation of the solvent through the hops to dissolve and wash out the desired extractives. Extraction processes based on this principle are slow, requiring about three to ten hours per batch of hops in so-called batch extractors, or three to four hours in continuous moving basket or belt types of extractors. This is a disadvantage not only from the standpoint of plant capacity, but also because the useful flavor components of hops are labile to a considerable degree, and in order to obtain a high quality extract, the shortest possible processing time is desirable. Furthermore, with percolation methods maximum yields of extractives are rarely obtained and large volumes of solvent are required.

Further, most prior processes for hop extraction include grinding of the hops in an attempt to release the extractive values thereof. These extractive values generally are contained in minute, almost microscopic resin glands, commonly known as lupulin. The lupulin gland has, as part of its structure an enclosing film or sac of material which is difficultly soluble in most solvents. The commercially employed grinding methods, for the most part, are limited to two types (a) grinding in an impact mill, such as a hammer or colloidal mill, or (b) vigorous stirring of the hops in a solvent. It has been found, however, that both of these methods of grinding provide only partial rupture of the lupulin. In the case of the hammer mill, in which the hops are subdivided by impact with rapidly rotating hammers until the material will pass through a screen, it has been observed that the extremely small lupulin glands will, to a substantial degree, rapidly pass through the screen and out of the grinding zone without being ruptured. In the second case, where vigorous stirring is applied to the hops while suspended in solvent, the lupulin glands have been found to circulate freely in the solvent and very large numbers do not receive adequate impact from the stirring device to bring about rupture. It has also been observed that removal of the solvent liquor from a solvent-hop suspension after either of the above mentioned treatments does not provide a commercially acceptable or desirable yield of extractives, since a significant portion of the desired extractives are left behind in the residue in the still-intact lupulin glands.

It is therefore a principal object of the present invention to provide improved means and process for extracting hops with a solvent, thereby overcoming the disadvantages of prior art methods and apparatus employed for such extraction purposes.

It is a further object of the present invention to provide an improved apparatus and process for extracting hops whereby significantly greater yields of hop extract are attained.

Another object of the present invention is to provide an improved hop extraction process which reduces significantly the time heretofore required to produce a hop extract.

These and other objects of the invention will become apparent from a study of this specification, the accompanying drawings and the appended claims in which the various novel features of the invention are more particularly set forth.

It has now been found that improved yields of hop extract can be attained with minimum deterioration and a minimum volume of solvent if the hops are initially comminuted and extruded in a screw or auger type grinder provided with an orifice plate at the outlet end thereof and projecting lugs or anvils on the interior face of the barrel housing the screw or auger, suspending the comminuted hops in a solvent and forcibly removing the solvent extract mixture from the hop residue by a press.

The initial treatment of the hops, in accordance with the instant invention, makes possible substantially complete solution of hop extractives in a relatively short time when the comminuted hops are subsequently suspended in a solvent medium. This substantially complete solution of the hop extractives can occur only if substantially complete rupture of the lupulin film or sac which forms the containing wall of the lupulin gland is achieved thereby releasing the contained resins and making them available for solution in the solvent. In accordance with the method of this invention, virtually complete rupture of the lupulin is obtained by the employment of a grinder comprising a cylindrical barrel, with an orifice plate of variable aperture affixed at one end, a feed hopper affixed to the opposite end, a spiral screw or auger which propels the material through the barrel, and projecting lugs or anvils on the internal face of the barrel which cause the material being ground to be mulled, under pressure, as it is propelled through the barrel and extruded through the orifice plate. The high efficiency of this type of grinder for the rupture of the lupulin in hops results from the combined rolling, squeezing and mulling action caused by the coaction of the screw-anvil-orifice plate construction. The hop cone is comprised of a large amount of fibrous material (bracts and strigs) with the minute lupulin glands interspersed among this fibrous tissue. The action of this grinder in a large degree, utilizes the fibrous material of the hop cone itself as an abrasive agent to rupture the containing wall of the lupulin gland, by said continuous rolling and mulling, under pressure created by the combined action of the screw auger and the orifice plate through which the ground hops are ultimately extruded. By appropriately controlling the opening of the orifice plate apertures, the required back pressure is achieved so that the lupulin of the hops is virtually completely ruptured.

Once the rupture of the lupulin has been achieved in the above-described grinder, the dissolving of the lupulin resins can be accomplished by suspending and gently mixing or agitating the ground hops in a solvent thereby attaining substantially complete diffusion equilibrium. At the end of the suspension or mixing cycle the composition of the solvent liquor is essentially homogeneous throughout the mass of material, and the recovery of extractives is proportional to the percentage of the total solvent liquor recovered. For example, it has been determined that when one pound of hops is suspended in four pounds of solvent, substantially complete solution of the extractives present in the hops is attained.

After a brief mixing period, the suspension is transferred to a press which may be of batch or continuous type. In such a press the mixture is subjected to high pressure to remove as much of the solvent liquor as is practical. The type of press used is not critial, there being many suitable types commercially available. The principal requisites of the particular press employed are that it be capable of applying the required pressure and of retaining the fibrous hop residue while the liquor is pressed out.

It was determined that when the liquor was pressed out of the hop residue, under high pressure, only 0.1 lb. of liquor remained in each pound of hop residue. One lb. of hop residue represents about 1.2 lbs. of original hops, since about 15% to 20% of the original hop is dissolved in the solvent. The actual solvent liquor remaining in the residue is thus only about 0.083 lb. per lb. of original hops.

It can thus be seen that 3.917 lbs. of solvent liquor can be recovered out of the initial 4 lb. charge. This constitutes a recovery of 97.8% of the hop extractives. With conventional percolation methods, it has been found that substantially more than 4 lbs. of solvent are required and yields comparable to those attained by the instant invention are not realized. An additional advantage of the press method is that the solvent content of the spent hop residue is very low (approx. 0.1 lb. per lb. of residue) and the solvent recovery from this material requires only small apparatus and very little heat. In contrast, the spent hop residue discharged from percolation systems contains from 2 to 3 lbs. of solvent per lb. of hop residue, and sometimes more in the case of chlorinated solvents. The size of the equipment and the heat required to recover this solvent are accordingly much greater.

The invention will now be further described with reference to the accompanying drawings in which:

FIG. 1 is a schematic view of the apparatus which can be used to carry out the novel method of this invention;

FIG. 2 is a sectional view of the hop extruder taken along the line 2—2 of FIG. 1; and FIG. 3 is a schematic view of apparatus which can be used to carry out another embodiment of the instant invention.

As shown in the drawings and especially FIGS. 1 and 2, the means employed to comminute the hops thereby substantially completely rupturing the lupulin content thereof comprises a screw-type grinder 10, having a barrel housing 12 through which is axially aligned and operatively connected a screw or auger 14 mounted for rotational movement on shaft 16. The barrel housing 12 is provided with inlet 18 which is in communication with the outlet of hopper 20 which is adapted to contain whole hops. The barrel housing outlet 22 comprises an orifice plate 24, having a plurality of apertures 26 the opening of which can be adjustably controlled. Intermediate the inlet 18 and outlet 22 of the barrel housing 12 and disposed on the interior surface thereof generally normal or transverse to the longitudinal axis of the barrel housing is at least one anvil or projecting lug 28. Preferably, a pair of spaced lugs are employed although it will be recognized that more can be used, if desired.

The outlet 22 of the barrel housing 12 is in communication with the inlet 30 of a solvent mixing vessel 32, said inlet 30 also being in communication with means 34 for supplying solvent thereto from a source (not shown). Vessel 32 is also provided with agitation means 36, extending, preferably, throughout the length thereof and comprising a multi-blade paddle stirrer. The outlet 38 of vessel 32 is in communication with the inlet 40 of press 42 via valve means 44.

Press 42 comprises a perforated barrel housing 46 through which is axially aligned and operatively connected a spiral screw 48 mounted for rotational movement on shaft 50. The outlet 52 of perforated barrel housing 46 is constricted to cause a high pressure zone to develop in the barrel of the press. In fluid communication with the interior of the barrel through the perforations thereof is catch-basin 54 from which the solvent extract mixture is withdrawn through duct 56. While a screw-type press has been shown it will be obvious that other press means can also be used, the criteria being the ability of the press to remove substantially all of the solvent extract mixture from the hop residue.

In operation, whole hops are introduced into the hopper 20 and passed to the grinder 10 via inlet 18. The whole hops are then propelled by the spiral screw 14 into the barrel 12 of the grinder 10. Due to the constriction provided by the orifice plate 24 the hops are compressed in the barrel zone 60 and are mulled by combined action of the rotating screw 14 and the mixing action of the anvils 28 in the zone of high pressure. The mulling action and the attrition provided by the fibrous hop particles being rubbed together with the lupulin, with ultimate extrusion through the apertures in the orifice plate, cause complete rupture of the lupulin glands.

The ground hops emerge from the grinder and enter a mixing vessel 32 which may be of any convenient shape, such as the horizontal vessel shown, and equipped with a mixing device 36 which maintains the hops in suspension in the solvent. The solvent is introduced continuously at the inlet 34 in the desired proportion with respect to the incoming hops. The size of the mixing vessel 32 is sufficient to provide a residence time of 5 minutes or more for the hop suspension.

The mixture is drawn off continuously through outlet 38 and enters into a continuous high-pressure press 42 via valve 44 and inlet 40. A suitable press, as illustrated, comprises a spiral screw 48 which conveys the hops through a perforated barrel 46 toward the exit end 52 which is constricted in a suitable manner to cause a high-pressure zone to develop in the barrel of the press. The solvent extract mixture drains out through the perforations in the press barrel into a catch-basin 54, from which it is withdrawn through duct 56 for subsequent clarification. The solvent is then removed from the extractives by distillation and the product is thereby obtained as the residue. The hop residue, almost free of solvent liquor, passes out through the controlled orifice 52.

The process obviously can be carried out on a batch basis by substitution of a batch type press, of which several types are well known, in place of the continuous screw press shown.

The efficiency of extraction in the following examples was established by analysis of the original hops and the extracted hop residue for content of hop alpha acid, which is considered the most valuable component of the extract.

EXAMPLE I 60 lbs. of hop cones, containing 6.3% alpha acid, were ground in the above-described grinder, and the ground hops were suspended in 240 lbs. of hexane by stirring in a vessel for 10 minutes. The suspension was then transferred to a continuous screw press and the solvent liquor was pressed out. 54.5 lbs. of extracted residue were obtained containing 7.3% hexane, and 0.2% alpha acid (dry basis).

Calculation from these data show that 98.3% of the original solvent liquor was pressed out of the hops carrying with it, in solution, 97.5% of the alpha acid in the original hops.

EXAMPLE II 40 lbs. of hop cones, containing 6.3% alpha acid were ground in the above-described grinder and the ground hops were suspended in 280 lbs. of hexane by stirring in a vessel for 5 minutes. The mixture was transferred to a continuous screw press and the solvent liquor was pressed out. 36.7 lbs. of extracted hop residue were obtained, containing 11.5% hexane and 0.18% alpha acid (dry basis). Calculations from these data show that 98.5% of the solvent liquor and 97.4% of the alpha acid were removed from the hops.

It will be obvious that a large proportion of the residual alpha acid in the extracted hops can be removed by a second stage of suspension in solvent, followed by pressing out the solvent, and that a two stage system can be operated in counter current fashion, i.e., with the solvent liquor from the second pressing stage being used in the first suspension stage.

While, in the examples given, hexane was used as solvent, it is well known that other conventional solvents, such as methylene chloride, perchlorethylene, trichloroethylene, benzene, ethyl or methyl alcohol, acetone of ethyl acetate and others can also be used.

In the preparation of hop extracts for use in brewing, it is sometimes desirable to extract the water-soluble components of the hop tissue, after the first extraction has been made to remove the resinous substances which are soluble in organic solvents. It will be obvious from the foregoing that the same principle of extraction can be extended to include water extraction of the hop residue, and that the use of a high-pressure press facilitates extraction of the water-soluble components with a minimum volume of water, thus reducing the cost of subsequent evaporation of the water.

In another embodiment of the instant invention, as shown in FIG. 3, whole hops can be introduced into a mixing vessel 32 without previously having been extruded in extruder 10. As before, the mixing vessel can be provided with means for introducing a solvent for the desired resinous material of the hop cones as well as agitation means for thoroughly mixing and suspending the materials therein.

The mixture is then drawn off through outlet 38 and enters the high-pressure press 42 as described hereinbefore. As the mixture of hops and solvent travel to the discharge end 52 of the press, a substantial part of the lupulin is ruptured, releasing the desired resins for solubilizing with the solvent fraction present. It has been found that about 90% of the available resinous material can be recovered in a single stage operation. However, increased resin recovery has been found possible when the hop residue is recycled to a second mixing vessel to which is also introduced additional quantities of suitable solvent for the resinous matter. Fresh solvent alone is added at the second stage and can, if desired, be returned to the first stage thus providing a countercurrent operation.

This second stage mixing or suspension charge is then passed again to the high pressure press 42 to recover the solvent extract expressed from the charge through the perforated barrel 46 via duct 56. This two stage recovery system provides yields as high as 98% of the available desired resin in the initial hop charge.

What is claimed is:

1. Apparatus for extracting hops with a solvent comprising a hop extruder comprising a cylindrical barrel having a rotatable screw operatively connected to and axially aligned in said barrel and adaptable to move said hops from an inlet to an outlet thereof, at least one lug fixedly attached to the interior surface of said barrel intermediate the inlet and outlet thereof and an orifice plate at the outlet of said barrel, a suspension tank in communication with the outlet of said extruder and adaptable to receive hops extruded through said orifice plate at the outlet of said extruder, means for introducing a solvent into said suspension tank to produce a solvent extract of said extruded hops therein and a press in communication with the outlet of said suspension tank to receive said suspension and to separate said solvent extract from the remainder of said suspension.

2. The apparatus of claim 1 wherein said suspension tank includes suspension agitating means operatively attached thereto.

3. The apparatus of claim 1 wherein said press comprises a perforated cylindrical barrel having a rotatable screw operatively connected to and axially aligned in said perforated barrel and adaptable to move said suspension from the inlet to the outlet thereof, solvent extract collecting means in communication with the interior of said barrel through said perforations and adaptable to receive said solvent extract separated from the contents of said suspension tank and outlet means for said press having an opening of lesser dimensions than the cross-sectional dimensions of said perforated barrel.

4. In apparatus for extracting resin from the lupulin of hops with a solvent including means for comminuting said hops thereby rupturing said lupulin and releasing said resins for solution with said solvent, the improvement comprising a hop extruder comprising a cylindrical barrel having a rotatable screw operatively connected to and axially aligned in said barrel and adaptable to move said hops from the inlet to the outlet thereof, said extruder outlet provided with an orifice plate, and at least one lug fixedly attached to the interior surface of said barrel intermediate the outlet and inlet of said barrel.

5. A process for extracting the resin present in the lupulin of hops with a solvent which comprises introducing the hops into an extruder having at the outlet thereof an orifice plate provided with a plurality of apertures, said extruder having a radially projecting lug on the interior surface thereof, extruding said hops by passing the same under pressure through said extruder thereby providing a mass of extruded hops in which the lupulin glands thereof are ruptured and the resin therein is released suspending said mass of extruded hops in a solvent for said released resin to provide a solvent-resin extract, and pressing the resulting suspension to separate the solvent-resin extract from the remainder of said suspension.

6. A process for extracting the resin present in the lupulin of hops with a solvent which comprises introducing the hops into an extruder having at the outlet thereof an orifice plate provided with a plurality of apertures, said extruder having a radially projecting lug on the interior surface thereof, extruding said hops by passing the same under pressure through said extruder thereby providing a mass of extruded hops in which the lupulin glands thereof are ruptured and the resin therein is released, conveying said extruded hops to a suspension zone, suspending said mass of extruded hops in a solvent for said released resin to provide a solvent-resin extract, agitating the resulting suspension, conveying said suspension to a separation zone and pressing said suspension in said separation zone to separate the solvent-resin extract from the remainder of said suspension.

7. A continuous process for extracting the resin present in the lupulin of hops with a solvent comprising
   (a) continuously introducing hops into the inlet of an extruder having at the outlet thereof an orifice plate provided with a plurality of apertures, said extruder having a radially projecting lug on the interior surface thereof,
   (b) extruding said hops by passing the same under pressure from the inlet thereof through the outlet thereof thereby providing a mass of extruded hops in which the lupulin glands thereof are ruptured and the resin therein is released,
   (c) conveying said extruded hops to a suspension zone,
   (d) introducing into said suspension zone a solvent for said released resin, (e) suspending said extruded hops in said solvent to provide a solvent-resin extract,
(f) agitating said suspension,
(g) conveying said suspension to a separation zone,
(h) pressing said suspension in said separation zone to separate the solvent-resin extract from the remainder of said suspension,
(i) recovering said solvent-resin extract; and
(j) repeating steps (a) to (i) as often as desired.

References Cited
UNITED STATES PATENTS

| | | | |
|---|---|---|---|
| 1,244,352 | 10/1917 | McNally | 241—247 |
| 1,290,975 | 1/1919 | Greene | 241—247 |
| 2,181,931 | 12/1939 | Wood | 99—50.5 |
| 2,912,923 | 11/1959 | Jung | 100—117 |
| 3,067,269 | 12/1962 | Speckhardt | 100—117 |
| 3,092,497 | 6/1963 | Hoelle et al. | 99—50.5 |

FOREIGN PATENTS

| | | |
|---|---|---|
| 3,896 | 10/1878 | Great Britain. |
| 459,635 | 1/1937 | Great Britain. |

LIONEL M. SHAPIRO, Primary Examiner

U.S. Cl. X.R.

99—278; 100—117, 144; 241—246